US010027498B2

(12) United States Patent
Yeom et al.

(10) Patent No.: US 10,027,498 B2
(45) Date of Patent: Jul. 17, 2018

(54) METHODS AND APPARATUSES FOR DELIVERING USER-ASSISTED DATA USING PERIODIC MULTICAST

(71) Applicant: RESEARCH & BUSINESS FOUNDATION SUNGKYUNKWAN UNIVERSITY, Suwon-si (KR)

(72) Inventors: Ik Jun Yeom, Suwon-si (KR); Young Hoon Kim, Seoul (KR); Yu Sung Kim, Suwon-si (KR); Jeong Hwan Choi, Seongnam-si (KR)

(73) Assignee: Research & Business Foundation Sungkyunkwan University, Suwon-si (KR)

( * ) Notice: Subject to any disclaimer, the term of this patent is extended or adjusted under 35 U.S.C. 154(b) by 74 days.

(21) Appl. No.: 14/530,980

(22) Filed: Nov. 3, 2014

(65) Prior Publication Data

US 2015/0124581 A1 May 7, 2015

(30) Foreign Application Priority Data

Nov. 1, 2013 (KR) ........................ 10-2013-0132301

(51) Int. Cl.
*H04L 12/18* (2006.01)
*H04L 29/08* (2006.01)
(Continued)

(52) U.S. Cl.
CPC ...... *H04L 12/1868* (2013.01); *H04L 65/4076* (2013.01); *H04L 65/4084* (2013.01);
(Continued)

(58) Field of Classification Search
CPC ............ H04L 12/1868; H04L 65/4076; H04L 65/4084; H04L 65/80; H04L 67/1078;
(Continued)

(56) References Cited

U.S. PATENT DOCUMENTS 8,073,924 B2 * 12/2011 Sitaraman ............ G06Q 10/103
709/213
8,135,040 B2 * 3/2012 Cuijpers ............. H04L 12/1859
370/432

(Continued)

FOREIGN PATENT DOCUMENTS

KR    10-2013-0059556 A    6/2013

OTHER PUBLICATIONS

DVH-H IP Data-casting standard, DVB-CBMS, «, IP Datacast over DVB-H; Content Delivery Protocols (CDP)», DVB Document A101, Dec. 2005, at pp. 30-31 subsection 7.3.1.*

(Continued)

*Primary Examiner* — Asad Nawaz
*Assistant Examiner* — Thomas R Cairns
(74) *Attorney, Agent, or Firm* — NSIP Law

(57) ABSTRACT

Disclosed herein are a method and apparatus for delivering user-assisted multimedia data using periodic multicast, which provide stable high-capacity Video-On-Demand (VOD) streaming service by proposing a user-assisted video transfer scheme capable of replacing a client-server configuration in providing high-capacity VOD streaming service.

19 Claims, 13 Drawing Sheets

(51) Int. Cl.
    *H04L 29/06*     (2006.01)
    *H04N 21/472*     (2011.01)
    *H04N 21/63*     (2011.01)
    *H04N 21/6405*     (2011.01)
    *H04N 21/6408*     (2011.01)

(52) U.S. Cl.
    CPC .......... *H04L 65/80* (2013.01); *H04L 67/1078* (2013.01); *H04N 21/47202* (2013.01); *H04N 21/632* (2013.01); *H04N 21/6405* (2013.01); *H04N 21/6408* (2013.01)

(58) Field of Classification Search
    CPC ........... H04N 21/47202; H04N 21/632; H04N 21/6405; H04N 21/6408
    See application file for complete search history.

(56) References Cited

U.S. PATENT DOCUMENTS

| | | | | |
|---|---|---|---|---|
| 8,527,845 | B2* | 9/2013 | Souza | H04N 21/4788 714/776 |
| 8,752,100 | B2* | 6/2014 | Ramakrishnan | H04N 7/17318 709/231 |
| 2009/0116481 | A1* | 5/2009 | Ishii | H04N 7/17318 370/390 |
| 2009/0240701 | A1* | 9/2009 | Gautier | H04L 12/1868 |
| 2011/0246658 | A1* | 10/2011 | Dettori | H04L 67/1008 709/231 |
| 2012/0151051 | A1* | 6/2012 | Zhang | H04L 67/06 709/224 |
| 2012/0179778 | A1* | 7/2012 | Deswardt | H04L 67/06 709/217 |
| 2014/0003237 | A1* | 1/2014 | Kenney | H04W 28/10 370/235 |

OTHER PUBLICATIONS

Human Translation of Korean Patent Application Publication 10-20110125591.*

Korean Office Action dated Aug. 25, 2014, in counterpart Korean Application No. 10-2013-0132301 (6 pages, in Korean).

* cited by examiner

METHODS AND APPARATUSES FOR DELIVERING USER-ASSISTED DATA USING PERIODIC MULTICAST

Priority to Korean patent application number 10-2013-0132301 filed on Nov. 1, 2013, the entire disclosure of which is incorporated by reference herein, is claimed.

BACKGROUND OF THE INVENTION

Field of the Invention

The present invention relates to a method of sending multimedia data and, more particularly, to a method of sending a large amount of multimedia data.

Discussion of the Related Art

Multimedia service provided by sending video and audio content is the most popular service in Internet-based services. For high-quality multimedia service, the size of video and audio content is increased.

Various types of methods for sending a large amount of multimedia content are being proposed. One of the methods is a client-server transfer scheme. The client-server transfer method is problematic in that service quality is severely deteriorated if the number of users is greater than the number of users handled by a server due to a load of the server increased as the number of users is increased. A task for improving performance of a server for solving such a problem requires great expense.

Another method is an IP multicast scheme. IP multicast is a technology for sending the same packet to a plurality of users at once and may be applied to services, such as real-time streaming and a video conference. In the case of Video On Demand (VOD), however, if the IP multicast technology is applied, there is a problem in that quality of service is deteriorated because a delay time taken for many users to start to be provided with service (hereinafter called a "start delay time") is lengthened because users request the same content at different times.

In addition, a Content Delivery Network (CDN) scheme for copying content to cache servers installed at the lower end of a network close to a user and delivering the content from a cache server to a user when the content is demanded and a P2PVoD scheme using a P2P technology when sending video have been proposed.

However, the CDN scheme are problematic in that it may not be applied to small-scale business operators due to a high installation charge and it may have the same problems occurring in the client-server transfer method if users are crowded in a single cache server.

Furthermore, the P2PVoD scheme may reduce a load of a server because video is received from corresponding users if the number of users who watch the same content is many, but has a problem in that the start delay time is lengthened if the number of users is small and playback may be interrupted if a user who provides video departs from a service system.

SUMMARY OF THE INVENTION

The present invention provides a data transmission method and apparatus, which are capable of reducing the overhead of a server using IP multicast and P2P without deteriorating quality of service provided to a user when providing high-capacity VOD streaming service.

In accordance with an aspect of the present invention, a data transmission method includes a data transmission method performed by a server configured to send content data to a terminal, includes sending, by the server, multicast data to the terminal joined in a multicast stream through multicast transmission and sending, by the server, assistant data that supplements the multicast data to the joined terminal.

The assistant data may include at least one of multicast data not delivered to the joined terminal and information about a device having multicast data not delivered to the joined terminal.

The multicast data not delivered to the joined terminal may be data transmitted through a multicast stream before the joined terminal joins in a multicast session.

Sending, by the server, assistant data that supplements the multicast data to the joined terminal may include sending, by the server, the assistant data to the joined terminal through a unicast stream while the multicast transmission is performed.

Sending, by the server, assistant data that supplements the multicast data to the joined terminal further may include sending, by the server, the assistant data to the joined terminal through unicast when a P2P capacity is saturated.

Sending, by the server, assistant data that supplements the multicast data to the joined terminal further may include performing, by the server, a comparison on an uplink capacity of at least any one device having the assistant data and a number of joined terminals that request a transmission of the assistant data and determining whether or not the P2P capacity is saturated based on a result of the comparison.

The multicast transmission may be periodically generated in a cycle determined based on the request rate of at least one terminal and the P2P capacity of devices having the assistant data.

The cycle of the multicast transmission may be changed by any one of the arrival rate and departure rate of the at least one terminal.

Sending, by the server, multicast data to the terminal joined in a multicast stream through multicast transmission may include collecting requests of terminals that have a delay time and joined with respect to the multicast data prior to a start of the multicast transmission and sending the multicast data to a joined terminal that has requested the multicast data during the delay time through multicast transmission.

In accordance with another aspect of the present invention, a data reception method performed by a terminal configured to receive content data from a server includes receiving, by the terminal, the multicast data of the server and requesting, by the terminal, lost data not included in the multicast data from the server.

The data reception method may further include receiving, by the terminal, the lost data through at least one of unicast transmission of the server and P2P transmission of a device having multicast data not delivered to the terminal, and may further include sending, by the terminal, any one of reception conditions and available uplink bandwidth of the multicast data to the server.

The method may be implemented using a recording medium on which a computer-readable program for performing the method using a computer is recorded.

In accordance with further another aspect of the present invention, a server includes a first transmission unit configured to send multicast data to a terminal through multicast transmission and a second transmission unit configured to send assistant data that supplements the multicast data to the terminal.

The assistant data may include at least one of multicast data not delivered to the terminal and information about a device having multicast data not delivered to the terminal.

The multicast data not delivered to the terminal may be data transmitted through a multicast stream before the terminal joins in a multicast session.

The first transmission unit may periodically perform the multicast transmission in a cycle determined based on a request rate of at least one terminal and a P2P capacity of devices having the assistant data.

The second transmission unit may send the assistant data to the terminal through unicast when a P2P capacity is saturated.

In accordance with yet another aspect of the present invention, a user terminal includes a reception unit configured to receive multicast data of a server and a transmission unit configured to request lost data not included in the multicast data from the server.

The reception unit may receive the lost data through at least one of unicast transmission of the server and P2P transmission of a device having the lost data. The reception unit may receive the lost data through unicast transmission of the server and P2P transmission of another terminal.

DETAILED DESCRIPTION OF THE EMBODIMENTS

Figure 1:
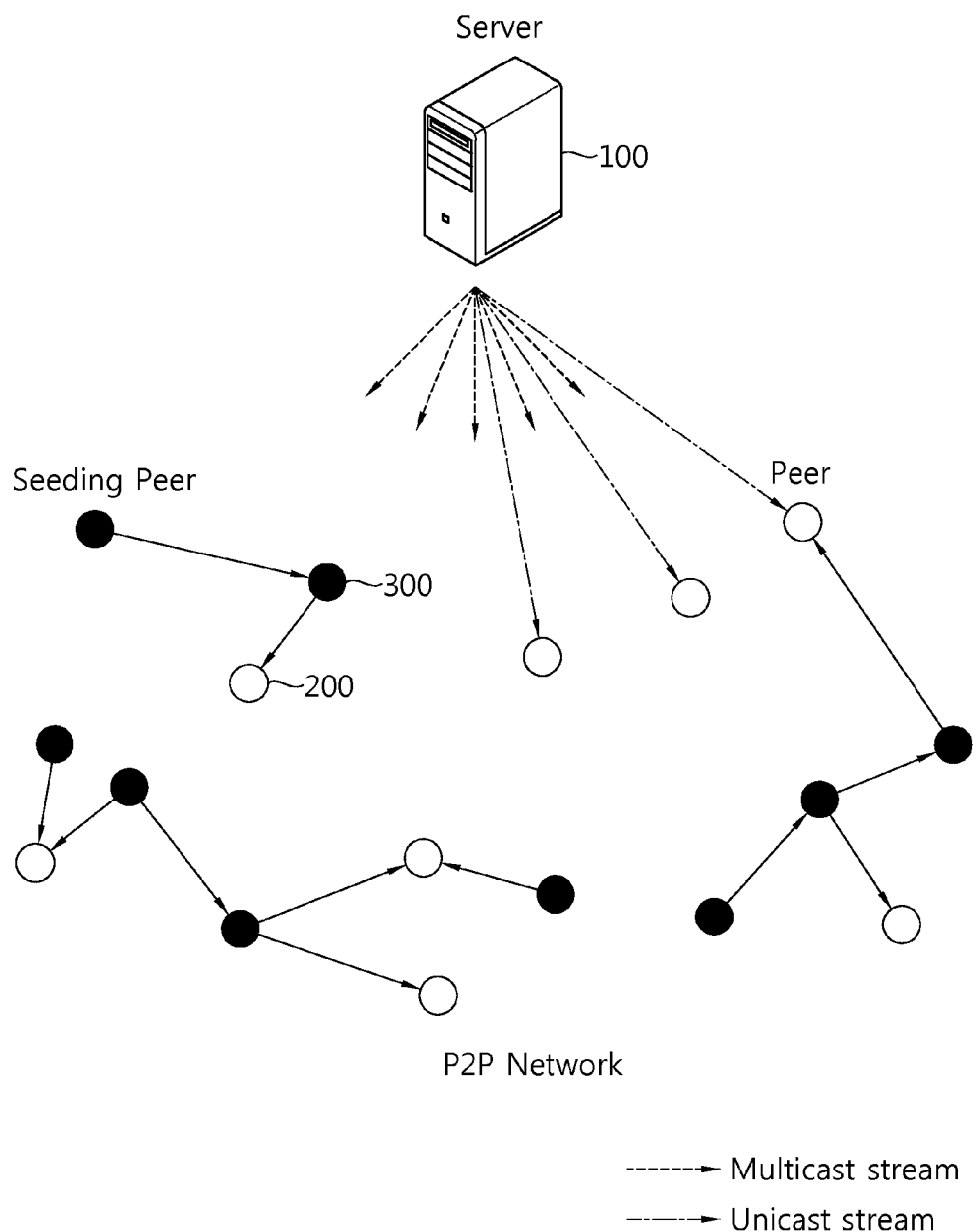
FIG. 1 is a conceptual diagram illustrating a data transmission system in accordance with an embodiment of the present invention.

The present invention may be modified in various ways and may be implemented to have several embodiments. Specific embodiments are illustrated in the drawings and are described in detail.

It is however to be understood that the present invention is not intended to be limited to the specific embodiments, but that the specific embodiments include all modifications, equivalents, and substitutions which fall within the spirit and technical scope of the present invention.

Terms, such as the first and the second, may be used to describe various elements, but the elements should not be restricted by the terms. The terms are used to only distinguish one element from the other element. For example, a first element may be named a second element without departing from the scope of the present invention. Likewise, a second element may be named a first element. The term "and/or" includes a combination of a plurality of related and illustrated items or any one of a plurality of related and described items.

When it is said that one element is "connected" or "coupled" with the other element, it should be understood that one element may be directly connected or coupled with the other element, but a third element may exist between the two elements. In contrast, when it is said that one element is "directly connected" or "directly coupled" with the other element, it should be understood that a third element does not exist between the two elements.

The terms used in this application are used to only describe specific embodiments and are not intended to restrict the present invention. An expression of the singular number includes an expression of the plural number unless clearly defined otherwise in the context. In this application, terms, such as "comprise" or "have", are intended to designate that characteristics, numbers, steps, operations, elements, or parts which are described in the specification, or a combination of them exist, and should not be understood that they exclude the existence or possible addition of one or more other characteristics, numbers, steps, operations, elements, parts, or combinations of them in advance.

All terms used herein, unless defined otherwise, have the same meanings as those typically understood by those having ordinary skill in the art. The terms, such as ones defined in common dictionaries, should be interpreted to have the same meanings as terms in the context of pertinent technology, and should not be interpreted to have ideal or excessively formal meanings unless clearly defined in the specification.

Hereinafter, some exemplary embodiments of the present invention are described in more detail with reference to the accompanying drawings. In describing the present invention, in order to help general understanding, the same reference numerals are used to denote the same elements throughout the drawings, and a redundant description of the same elements is omitted.

A method of sending multimedia data in accordance with an embodiment of the present invention provides a technology for providing stable high-capacity VOD streaming service at a low cost by proposing a user-assisted video transfer scheme capable of replacing a client-server configuration in providing high-capacity Video-On-Demand (hereinafter called "VOD") streaming service. A kind of a hybrid technology in which a Peer to Peer (P2P) technology has been applied to an IP multicast technology includes a scheme for reducing a load of a server through an optimization algorithm. The conceptual diagram of a system is illustrated in FIG. 1. In such a system, a streaming server sends multimedia to users in a controllable cycle through IP multicast. Upon receiving multicast stream, a user first stores content parts required for the user and performs reception from users included in his or her storage space. If users are not sufficient in P2P, the server may supplement service providing through unicast.

FIG. 1 is a conceptual diagram illustrating a data transmission system in accordance with an embodiment of the present invention. The data transmission system in accordance with an embodiment of the present invention includes a server 100 and peers 200, as illustrated in FIG. 1. The server 100 sends data, such as multimedia content, to the peers 200 using multicast and unicast. For example, the server 100 may be a streaming server 100 configured to send multimedia content in real time. The peer 200 is user terminal configured to receive data, and may be a device, such as a personal computer, a smart phone, or another server. A seeder 300 is a peer 200 that sends data to another peer 200 using a method, such as P2P. The seeder is also called a seed. The server 100 and the peers 200 are connected in a wireless way or over a network, and the network may be configured in any form.

The server 100 periodically starts a multicast session. When a multicast session is started, the server 100 sends multimedia chunks to the peers 200 that have joined in multicast from the start and end of multimedia content. While the multicast session is in progress, the server 100 may permit the peers 200 to join in the multicast. The server 100 provides a multicast stream to the peers 200, joined in the multicast during the multicast session, from the time when the peers 200 joined in the multicast. If the peer 200 joined in the multicast in the middle of the multicast session and has lost streams prior to the joining or the peer 200 has requested specific data from the server 100, the server 100 may provide information about an available seeder 300 so that the peer 200 may receive data using P2P. If the number of available seeders 300 is not sufficient or the peer 200 is unable to receive data using P2P, such as in a case where a P2P capacity is full, the server 100 sends the lost data to the peer 200 using unicast.

The server 100 manages and stores information about the joining and departure of the peer 200 and the status of the seeder 300. In order to select an available seed in response to a request from the peer 200, the server 100 uses information about the status of the seeder 300. The information about the status of the seeder 300 may be generated using a notification message that is transmitted from the peer 200 to the server 100 in order to provide notification of its own status. The server 100 may precisely select the number of seeds when receiving a request for a chunk from the peer 200 using the notification message, and may send a list of seeds to the peer 200. As illustrated in Table 1, the notification message includes only the size of the available uplink bandwidth of each chunk and the IDs of the peers 200. Accordingly, a memory load is not increased although the number of notification messages is increased according to the number of peers 200. The server 100 can reduce look-up complexity using a hash function while selecting seeds. Table 1 below illustrates a server data structure.

TABLE 1

| CHUNK NUMBER | SEED ID (AVAILABLE UPLINK BANDWIDTH) |
| --- | --- |
| 0 | 2(1.0), 3(0.4), 5(1.2), 7(1.2), . . . |
| 1 | 0(0.3), 2(1.0), 3(0.4), 4(2.0), 5(1.2) |
| 2 | 0(0.3), 2(1.0), 3(0.4) |
| . . . | . . . |

The peer 200 may send a notification message to the server 100 in order to provide notification of its own status. For example, after completing the reception of a specific chunk, the peer 200 may send a notification message including detailed information related to the completion of the reception. Such information may include a chunk number, the ID of the peer 200 that has sent the specific chunk, and a current available uplink bandwidth. Furthermore, if an available uplink bandwidth or the status of a chunk is changed, the peer 200 may send such a change through a notification message.

The peer 200 joins in the most recent multicast session of the server 100 and requests a chunk for playback that may not be received from the joined multicast session from the server 100 or an adjacent seeder 300. For example, the peer 200 may request the chunk from the seeder 300 using information about the available seeder 300 that has been received from the server 100. Such chunks are provided through P2P as possible. If the chunks may not be provided through P2P, they may be provided through the unicast of the server 100. When the peers 200 receive a single complete chunk, they become the seeders 300 in a common P2P system and start seeding.

System Operation

Figure 2:
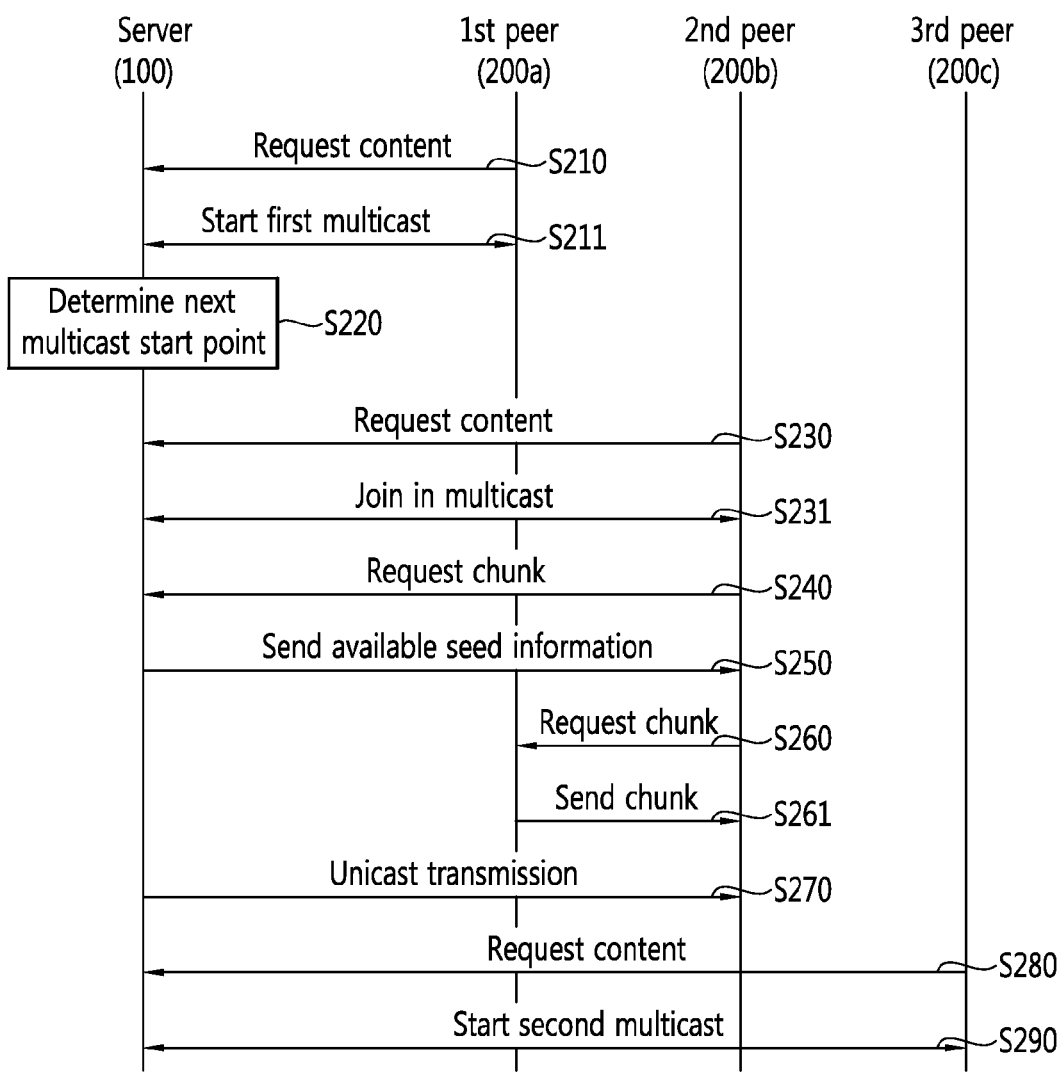
FIG. 2 is a flowchart illustrating a data transmission method in accordance with an embodiment of the present invention.

FIG. 2 is a flowchart illustrating a data transmission method in accordance with an embodiment of the present invention. The data transmission method in accordance with an embodiment of the present invention is described with reference to FIG. 2.

First, when multimedia content is prepared, the server 100 waits for a request. When a first peer 200a requests content from the server 100 at step S210 and the server 100 receives the first peer request, the server 100 starts streaming service for the corresponding content using a first multicast session at step S211.

Thereafter, the server 100 determines a next multicast start point at step S220. The server 100 checks a current data transmission status based on the number of seeds 300, that is, users who have stored content, an uplink bandwidth, and the number of peers 200, that is, users who request content, and determines a new IP multicast streaming start point at which next multicast streaming will be started at step S220. The new multicast start point may be determined so that a load of the server 100 is minimized.

Thereafter, a second peer 200b requests content from the server 100 at step S230. If a new multicast session has not been started, the server 100 allows the second peer 200b to join in the first multicast session, that is, a multicast session being provided, and sends a first multicast stream to the second peer 200b at step S231.

Figure 3:
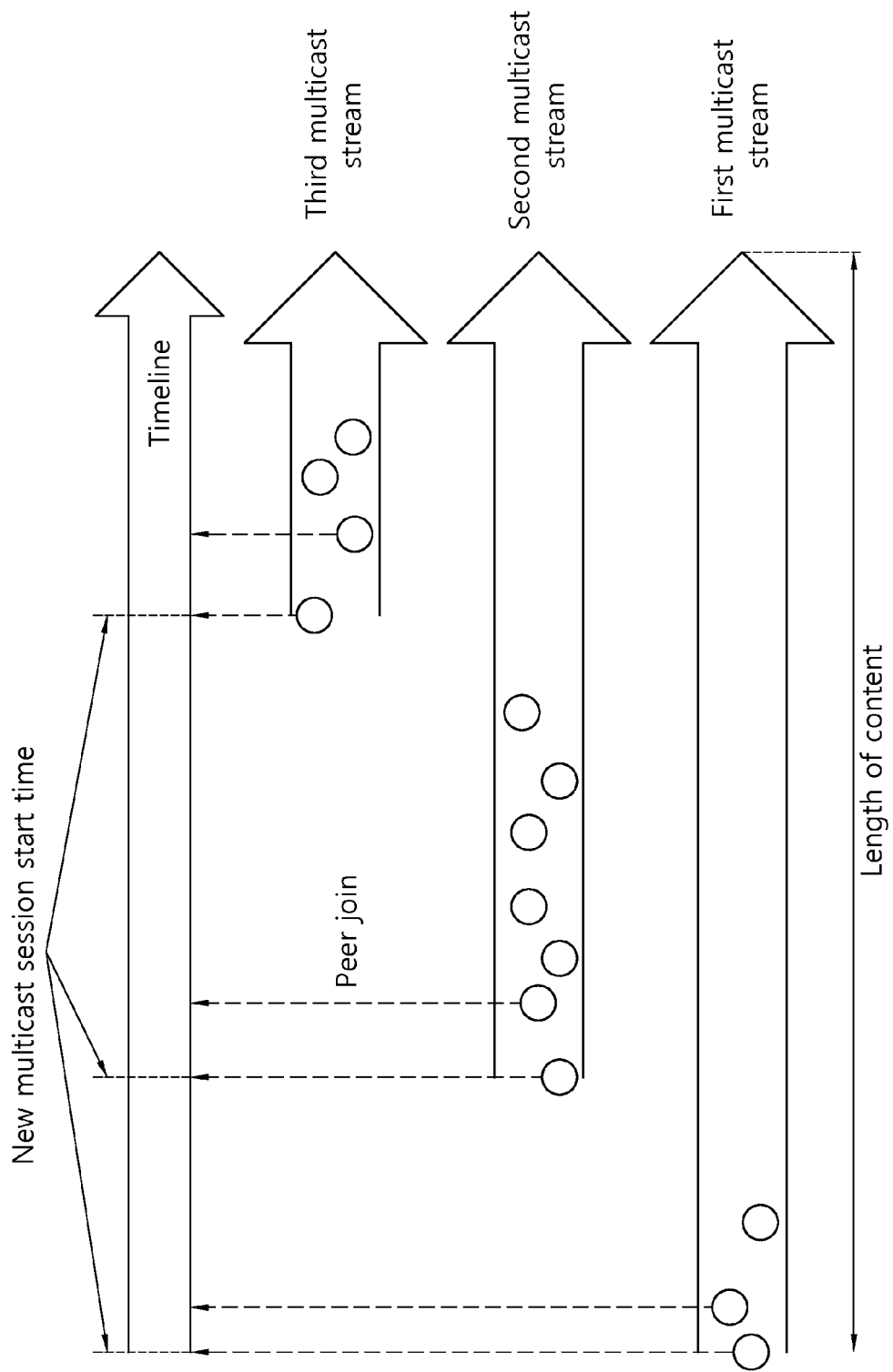
FIG. 3 is a diagram illustrating the relationship between first, second, and third multicast streams and a plurality of peers.

FIG. 3 is a diagram illustrating the relationship between first, second, and third multicast streams and a plurality of peers. The peer 200 that has been joined after a multicast session is started may join in a multicast session that belongs to existing multicast sessions and in which content requested by the peer 200 is transmitted, as illustrated in FIG. 3. In such a case, the peer 200 may join in a multicast session in which a part closest to a playback part required by the peer 200 is transmitted and may receive streaming data for the part.

Figure 4:
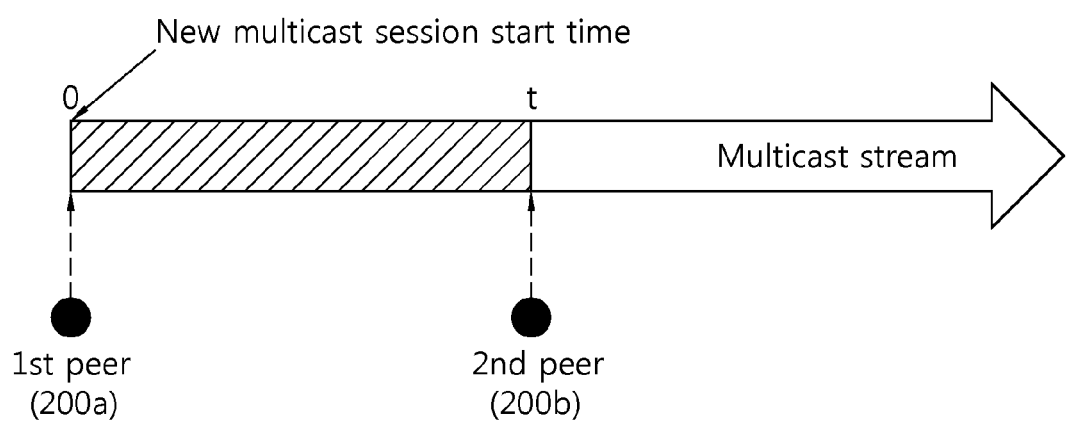
FIG. 4 is a conceptual diagram illustrating a lost part not received by a peer in data transmission in accordance with an embodiment of the present invention.

Thereafter, the peer 200 joined in the multicast session receives the data of a lost part that has not been received by the peer 200 because it has been transmitted prior to the joining from the seeders 300 that have the corresponding content. If the number of seeders 300 is not sufficient, the peer 200 receives the data of the lost part from the server 100 at step S240 to at step S270. In FIG. 4, a lost part not received by the second peer 200b is multimedia content data indicated by an oblique line between "0" to "t".

More specifically, as illustrated in FIG. 2, first, the second peer 200b requests a required chunk from the server 100 at step S240. If a multimedia content chunk for playback is required, the second peer 200b first checks chunks within its own buffer. The reason for this is that since the second peer 200b has joined in the multicast stream of the server 100, the second peer 200b may have the required chunk in its buffer. If the second peer 200b does not have the required content chunk, the second peer 200b sends a request to the server 100. The peers 200 may send a chunk request deadline along with the request. The chunk request deadline is a time limit that is required to ensure the playback of content not having delay.

When the request is received, the server 100 determines whether available seeds are sufficient or not. If, as a result of the determination, available seeds are not sufficient, the server 100 continues to determine whether available seeds are sufficient until the chunk request deadline is reached. If the number of seeders 300 for a required chunk is sufficient to process such requests before the chunk request deadline is reached, the server 100 sends information about the seeders 300 to the second peer 200b at step S250. The server 100 may send only information about a seed that has the required chunk and that has an available uplink bandwidth to the second peer 200b. When the second peer 200b requests the required chunk from the first peer 200a, that is, the corresponding seed, the first peer 200a sends the required chunk to the second peer 200b at step S261. In this case, the server 100 may allow seeds to directly send the required chunk to the second peer 200b. In such a case, step S250 and step S260 may be omitted.

If an available seed is not present as a result of the determination, the uplink bandwidth of a seed is not sufficient, or the chunk request deadline has elapsed, the server 100 may directly send the required chunk to the second peer 200b using unicast at step S270. In such a case, step S250 to step S261 may be omitted. In other embodiments, the transmission of the seeds and the unicast transmission of the server 100 may be simultaneously performed.

Thereafter, after a specific time elapses, the server 100 starts another multicast session. The newly started multicast session is independent of the previous multicast stream. For example, as illustrated in FIG. 2, in response to a content request from a third peer 200c at step S280, the server 100 performs the second multicast session independently of the first multicast session at step S290. The aforementioned method may be applied to the newly started multicast session. In this case, if frequency of requests from the peers 200 that join in the system is suddenly changed or the number of seeds is changed, the server 100 may detect such a changed situation and calculate a point of time at which a next multicast session is started again.

Determination of a Multicast Session Cycle

In the data transmission method in accordance with an embodiment of the present invention, a cycle between multicast sessions is determined in order to reduce a load of the server 100. In the data transmission method in accordance with an embodiment of the present invention, a cycle in which a load of the server 100 for each peer 200 is a minimum is determined to be a multicast session cycle.

Figure 5:
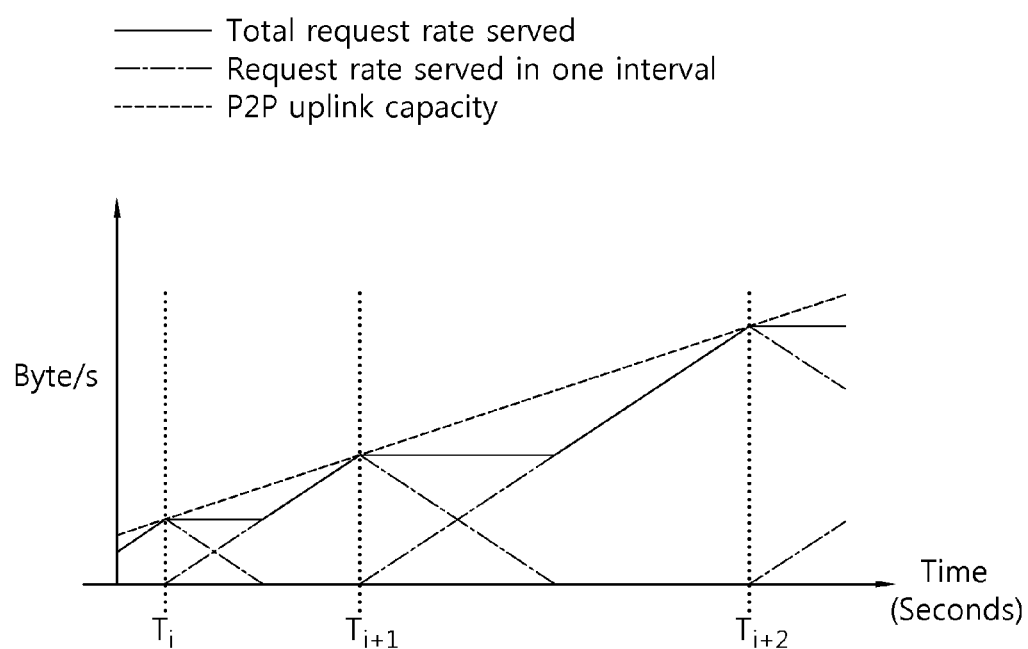
FIG. 5 is a graph illustrating the request of a peer and the uplink capacity of a seed in data transmission in accordance with an embodiment of the present invention.

FIG. 5 is a graph illustrating the request of a peer and the uplink capacity of a seed in data transmission in accordance with an embodiment of the present invention. The server 100 monitors the uplink bandwidth of the seed 300 in P2P and starts a new multicast session at points of time $T_i$, $T_{i+1}$, and $T_{i+2}$ at each of which a bandwidth occupied by the request of the peer 200 that requests content exceeds the uplink bandwidth of the seed 300. The server 100 may determine a new multicast session start time using system status information, such as the arrival rate of the peer 200 (i.e., a peer arrival rate) and a current seed status.

As illustrated in FIG. 5, the bandwidths requested by the peers 200 are characterized in that they are maintained for a specific time when the new multicast sessions $T_i$, $T_{i+1}$, and $T_{i+2}$ are started and are then increased. A total uplink bandwidth of seeds is increased because the number of peers is increased over time. If a content playback bit rate is greater than a total uplink bandwidth of seeds, the number of content requests is rapidly increased compared to the total uplink bandwidth of the seeds, and thus becomes greater than the total uplink bandwidth of the seeds. A new multicast session is started based on such a point of time.

In such a case, however, the server 100 suffers from a load because an IP multicast session is excessively generated at the early stage of service in which the number of seeds is insufficient. For example, if the number of seeds is insufficient, a new multicast session is chiefly started in response to each request, and thus a load of the server 100 is increased because the number of peers 200 that perform reception from a single multicast session is small. In order to prevent such a problem, a point of time at which a load of the server 100 for each user becomes a minimum not a point of time at which the number of requests becomes greater than a P2P uplink bandwidth may be calculated. A point of time at which a multicast session is started may be determined based on the calculated point of time.

Figure 6:
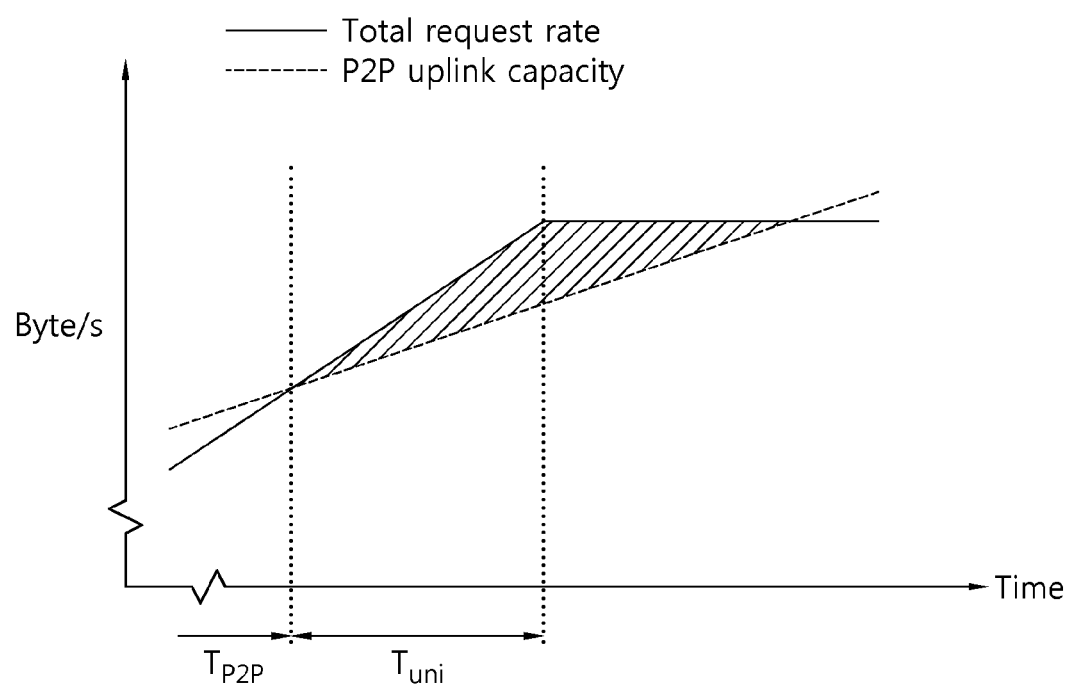
FIG. 6 is a graph illustrating a request rate and a P2P capacity in a data transmission method in accordance with another embodiment of the present invention.

FIG. 6 is a graph illustrating a request rate and a P2P capacity in a data transmission method in accordance with another embodiment of the present invention. In FIG. 6, $T_{P2P}$ is a point of time at which the number of requests becomes greater than a P2P uplink bandwidth. In the data transmission method in accordance with another embodiment of the present invention, in order to further reduce a load of the server 100, a new multicast session is started after a lapse of $T_{uni}$ from $T_{P2P}$. $T_{uni}$ is a period in which a peer request is processed through unicast. The cycle of the server 100 in which a load of the server 100 for each peer 200 is minimized may be determined by adding up a load of the server 100 for $T_{uni}$ and a load of the server 100 upon multicast.

Request Batch Processing

In a data transmission method in accordance with an embodiment of the present invention, when the server 100 starts a new multicast session, the server 100 may wait for a predetermined time and then start the new multicast session. Such a time is a total request batch processing time of requests from the peers 200. If such request batch processing is not performed, the server 100 starts a new multicast in response to each request. This may be inefficient because a single peer 200 performs reception from a new multicast session. In a data transmission method in accordance with an embodiment of the present invention, the batch processing time may be configured. If the system requires no delay, the batch processing time may be set to 0. In such a case, it may be inefficient because a load of the server 100 is relatively increased. Meanwhile, if the server 100 imposes some delay to the peers 200, the batching processing time may be set to a value greater than 0. In this case, a load of the server 100 may be reduced.

Access to Specific Location

Some users may want to watch video in the middle of the video. If such users have to download the video from the beginning, it may result in severe bandwidth consumption and start delay. In order to solve such requests, a method of joining in, users, the middle of a stream may be taken into consideration.

In other embodiments of the present invention, a plurality of multicast streams of video having different start times may coexist. The users may be allowed to join in part of a multicast stream that is now transmitted and that is adjacent to a point requested by the users. If a plurality of such streams is present, a multicast stream of a point that is now transmitted and that is closest to a point requested by a user may be selected in order to reduce traffic delivery using P2P or the unicast of the server 100. If such a stream is not present, a new stream started from a request location may be started. Such processing may increase the number of coexisting multicast streams, but such a load is limited to only the start of video service. If video is served from beginning to end, users who start from a specific location do not generate additional overhead.

Details of Multicast Session Cycle

A method of determining a multicast session cycle in a data transmission method in accordance with an embodiment of the present invention is described in more detail below. A proper interval length between two consecutive sessions is estimated through a mathematical analysis. This is performed by taking into consideration a proper interval length in which an average load of the server 100 for each peer 200 is minimized.

Table 2 illustrates symbols used during analyses.

TABLE 2

| Symbols | Definition |
|---|---|
| S | Load of server 100 (byte) |
| T | Interval length, $T_{P2P} + T_{uni}$ (second) |
| $T_{P2P}$ | Time lengthy (P2P request processing) (second) |
| $T_{uni}$ | Time length (sever 100 request processing) (second) |
| $T_E$ | Elapsed time related to system (second) |
| λ | Peer (200) arrival rate (the number of peers 200/second) |
| b | Content playback rate (byte/second) |
| u | Uplink bandwidth of peer 200 (byte/second) |
| α | Over-estimation parameter |
| β | Batch processing time (second) |
| L | Content length (second) |
| c | Chunk length (second) |

S' denotes an average load of the server 100 for each peer 200. S is a total load of the server 100 including both multicast and unicast for one interval. Furthermore, N is the number of peers 200 within such an interval. Accordingly, the average load of the server 100 E[S'] may be represented by Equation 1. Such a process is also applied to other intervals.

$$E[S'] = \frac{E[S]}{E[N]} \quad (1)$$

In a Poisson process having a constant arrival rate λ, it is assumed that the peers 200 are reached. The arrival rate λ is varied within one unit cycle. Accordingly, the arrival rate λ may be assumed to be a constant. A case where the arrival rate λ is very frequently varied is described later. It is also assumed that the peer 200 does not depart from the system. A modification for handling a situation in which the peer 200 departs from the system is described later. Under such assumptions, the number of peers 200 E[N] served within a multicast session interval may be simply represented by E[N]=λT. In this case, T is a proper interval length.

In an embodiment of the present invention, T consists of two different time lengths $T_{P2P}$ and $T_{uni}$, wherein $T=T_{P2P}+T_{uni}$. $T_{P2P}$ is the time when the peers 200 are provided with service through P2P. During $T_{P2P}$, the peers 200 consume a P2P capacity. Accordingly, the server 100 does not suffer from an additional load in addition to multicast transmission. In order to generate service quality, if sufficient peers 200 are not present within P2P, newly joined peers 200 obtain the unicast of the server 100 at $T_{uni}$. If $T_{uni}$ is set to 0, the server 100 has to immediately start a new multicast session after a P2P capacity is fully consumed. In such a case, the server 100 frequently starts a new multicast session because the time of a specific length is essential for the recovery of the P2P capacity. In the present invention, $T_{p2p}$ and $T_{uni}$ at which E[S'] is minimized are searched for. Since an average load of the server 100 is computed by dividing a total load of the server 100 by a total number of peers 200, the average load of the server 100 may be computed by dividing the sum of a load of the server 100 upon multicast and a load of the server 100 upon unicast by the sum of the number of peers 200 joined during P2P and the number of peers 200 joined during unicast. This may be represented by Equation 2 below. In Equation 2, $S_{multi}$ denotes a multicast load, and $S_{uni}$ denotes a load of the server 100 during $T_{uni}$.

$$E[S'] = \frac{E[S_{multi}] + E[S_{uni}]}{\lambda(T_{P2P} + T_{uni})} \quad (2)$$

$T_{p2p}$ and $T_{uni}$ may be calculated using a request rate of users (i.e., peers). Accordingly, a method of obtaining the request rate is described below.

Analysis of the Request Rate

Figure 7:
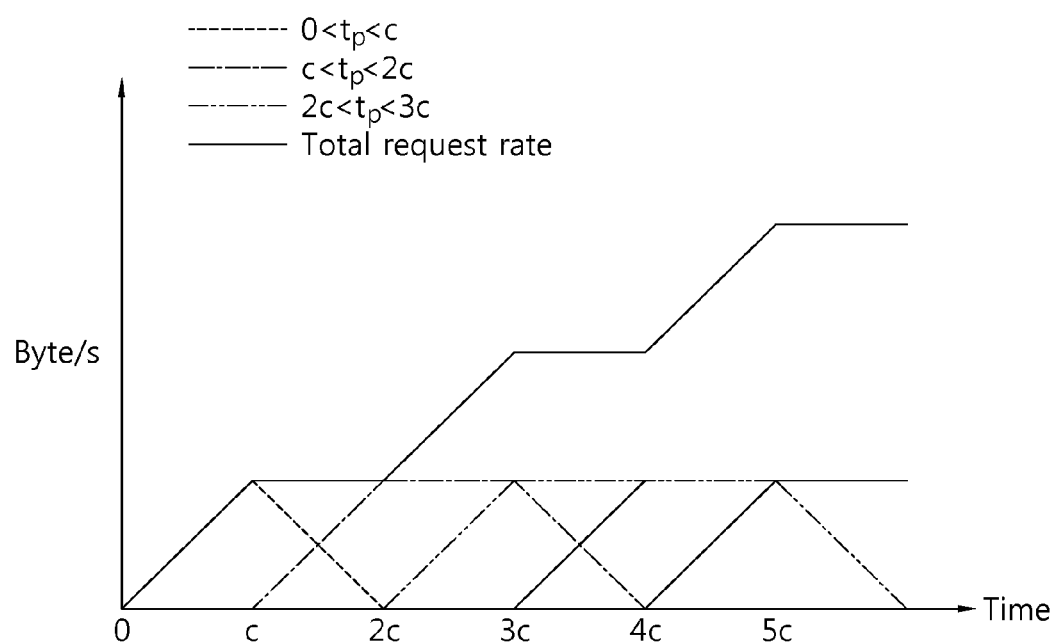
FIG. 7 is a graph illustrating time classified in order of chunks that are transmitted in a multicast stream in data transmission in accordance with an embodiment of the present invention.

In a data transmission method in accordance with an embodiment of the present invention, a bandwidth obtained by the peer 200 in order to play back content is the same as a multimedia playback rate "b" of the content. In this case, "b" is assumed to be a constant. Although a current encoding method, such as MPEG, adopts a variable bit rate, a current playback rate may be averaged based on each chunk. Accordingly, an average playback rate is used as the system parameter "b". At a time "t", the peers 200 joined prior to a time "t/2" complete the playback of their lost chunks through P2P or the unicast of the server 100. This is illustrated in FIG. 7 in more detail. At a time "4c", the peers joined prior to a time "2c" do not request chunks at the time "4c". Accordingly, only the peers 200 joined between the time "t/2" and the time "t" request content through P2P or the unicast of the server 100 at the time "t". Assuming that R(t) denotes a request rate at the time "t" according to the peers 200 joined in a single interval (0~T) and T denotes the length of the interval, the request rate R(t) at the time "t" may be represented by Equation 3 below.

$$E[R(t)] = \begin{cases} b\lambda \frac{t}{2} & 0 \le t \le T, \\ b\lambda\left(T - \frac{t}{2}\right) & T \le t \le 2T \end{cases} \quad (3)$$

A first equation in Equation 3 is the product of the number of peers 200 "λt/2" and the request rate "b" of each peer 200. The peers 200 newly joined after T are counted in a next interval. Accordingly, R(t) is reduced in the second equation of Equation 3. A total number of peers 200 served using Equation 3 in a next session and a total number of peers 200 served are constants with respect to the length of an interval T, and are increased after the length of an interval T.

When the peers 200 join in the system, a P2P capacity is increased and $T_{P2P}$ is lengthened. This is illustrated in FIG. 5.

FIG. 7 is a graph illustrating time classified in order of chunks that are transmitted in a multicast stream in data transmission in accordance with an embodiment of the present invention. Detailed forms are illustrated in FIG. 7 by taking the size "c" of a chunk into consideration. Since a request is made according to the size of a single chunk, each peer 200 having a joining time $T_p$ of $0 < T_p < c$ is served during the time interval "c". A request rate of the peers 200 each having the joining time $T_p$ of $0 < T_p < c$ is represented by the leftmost triangle of FIG. 7 that is surrounded by a dash line that is started from 0 and terminated at the time "2c". When former peers 200 of the peers complete their requests, the request rate is reduced after the time "c". The peers 200 joined between the time "c" and the time "2c" are served with respect to the time interval of 2c because they are unable to obtain first and second chunks from a multicast stream. Accordingly, the service of the peers 200 joined between the time "c" and the time "2c" is terminated at a time "4c".

Likewise, a request rate is illustrated. Finally, all the requests are added to produce a total request rate at a specific time which is drawn in a stepped form as in the entire request rate graph of FIG. 7. The request rate of FIG. 7 was calculated in the form of an average number of the peers 200 in the Poisson process linearly distributed over time.

Figure 8:
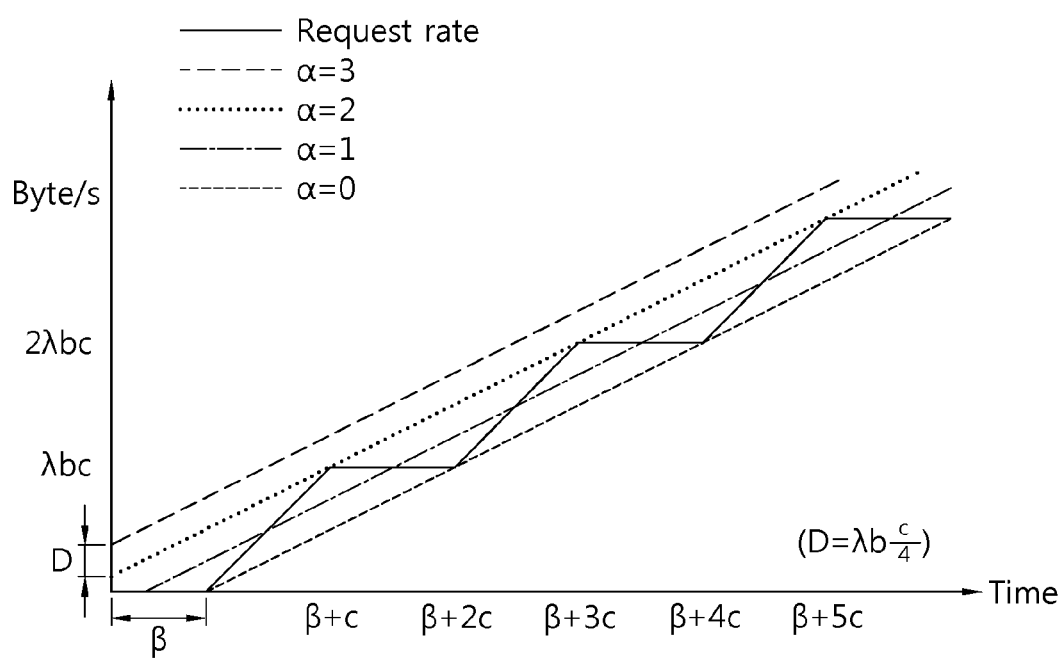
FIG. 8 is a graph illustrating a request rate when batch processing is transmitted in a data transmission method in accordance with an embodiment of the present invention.

FIG. 8 is a graph illustrating a request rate when batch processing is transmitted in a data transmission method in accordance with an embodiment of the present invention. FIG. 8 illustrates a graph in which the size of a chunk is not taken into consideration in a reference dash graph α=0, but a batch processing time β is taken into consideration. A request of any peer 200 is not present because the requests of the peers 200 are synthesized during β. When the size of a chunk is taken into consideration, an average graph of the request rates of the peers 200 is obtained by adding D=λbc/4 to the reference graph. More requests than those predicted may be present as if the step of a request graph sometimes touches an average graph.

In order to prevent such a situation, the average graph may be moved in parallel by adding D to the average graph at least once. In order to reflect how many requests have been excessively predicted, the parameter α may be used in Equation 3. Equation 4 below denotes a request rate at the time "t" in which both α and β are taken into consideration.

$$E[R(t)] = \lambda b \frac{t - \beta}{2} + \alpha \lambda b \frac{c}{4} \quad (4)$$

$$= \lambda b \frac{t - \beta + \alpha \frac{c}{2}}{2}$$

The system in accordance with an embodiment of the present invention may be controlled based on the parameter α and the request batch processing time. As a system batch processing time is increased, less unicast is generated. Furthermore, if the parameter α described with reference to FIG. 8 is small, the system is not sufficiently robust to the joining of the peer 200 in a first stage, and the number of pieces of unicast is increased. This results in an increase of a load of the server 100. If the parameter α is great, the system becomes tolerant to the joining of the peer 200 without a sufficient P2P capacity, and the range of a load of the server 100 becomes narrower than that when the parameter α is low and becomes predicted. However, since multicast streaming is frequently generated as the parameter α is increased, a load of the server 100 is averagely increased as the parameter α is increased. The parameter α was measured to be efficient in a range of 0 to 4. The reason for this is that too many multicast sessions are generated when the parameter α is greater than 4. In particular, if the parameter α is 1, a load of the server 10 was the lowest. Such results are indicative that the system may be controlled depending on service requirements, such as a load of the server 100 and the start delay of the peer 200.

Calculation of Multicast Session Cycle

In a data transmission method in accordance with an embodiment of the present invention, a method of calculating $T_{P2P}$ and $T_{uni}$ so as to calculate a multicast session cycle is described. $T_{P2P}$ and $T_{uni}$ are calculated based on the arrival rate of the peer 200, the length of multimedia content, and the uplink bandwidth of the peer 200. The arrival rate of the peer means the degree that the peer makes a request of the server.

A P2P network may process all requests until a total number of requests do not exceed the uplink capacity of seeds. Such a range is illustrated in Equation 5 below. $T_E$ denotes an elapsed time on the system side from the start of the system. u denotes the uplink bandwidth of the peer 200 that is the same for all the peers 200.

$$\lambda u(T_E + T_{P2P} - \beta) = \lambda b \frac{T_{P2P} - \beta + \alpha \frac{c}{2}}{2} \quad (5)$$

In $T_E + T_{P2P}$, a total uplink bandwidth of the seeder 300 becomes identical with $R(T_{P2P})$. As in Equation 4, in Equation 5, the right side denotes a request rate at a time $T_{P2P}$, and the left side denotes a total uplink capacity of the seeders 300. B is taken into consideration in both sides of Equation 5.

Since the peer 200 needs to have at least one complete chunk in order to become a seed, the peers 200 joined in the system at the last time "c" may not be served as seeds. If this is taken into consideration in Equation 5, the left side may be modified as in Equation 6 in order to reflect such a consideration.

$$\lambda u(T_E + T_{P2P} - \beta - c) = \lambda b \frac{T_{P2P} - \beta + \alpha \frac{c}{2}}{2} \quad (6)$$

Accordingly, $T_{P2P}$, that is, a point of time at which the uplink bandwidth of P2P becomes greater than a total request, may be derived from Equation 6 as in Equation 7 below.

$$T_{P2P} = \frac{2(T_E - c)u - \alpha\frac{c}{2}b}{b - 2u} + \beta \qquad (7)$$

As described with reference to FIG. 6, a total number of requests may be regularly maintained temporarily after a new multicast stream is started. If the server 100 waits for during the time $T_{uni}$, the number of unicast requests corresponds to a triangular area indicated by shading of FIG. 5. Accordingly, the number of unicast requests after the time $T_{P2P}$ may be represented as in Equation 8 below.

$$E[S_{uni}] = \lambda T_{uni}^2 \frac{b(b-u)}{2u} \qquad (8)$$

In this case, assuming that the length of media content is L, a load of the server 100 with respect to multicast may be simply represented by "Lb". Accordingly, a total load of the server 100 may be calculated using Equation 9 below.

$$E[S] = E[S_{multi}] + E[S_{uni}] \qquad (9)$$
$$= Lb + \lambda T_{uni}^2 \frac{b(b-u)}{2u}$$

Accordingly, if Equation 9 is applied to Equation 2, an average load of the server 100 and $T_{uni}$ in which a load of the server 100 is minimized may be calculated to be Equation 10 and Equation 11 below, respectively.

Furthermore, a time interval having a specific system status is calculated to be the sum of Equation 7 and Equation 11. It is not necessary to take the size of a chunk into consideration when $T_{uni}$ is calculated because the number of unicast requests is not influenced by the size of a chunk after the time $T_{P2P}$ indicated by a shade area of FIG. 6. On the contrary, the number of unicast requests is influenced by the slope of the graph.

$$E[\bar{S}] = \frac{E[S]}{E[N]} \qquad (10)$$
$$= \frac{Lb + \lambda T_{uni}^2 \frac{b(b-u)}{2u}}{\lambda(T_{P2P} + T_{uni})}$$

$$T_{uni} = \sqrt{T_{P2P}^2 + \frac{2Lu}{\lambda(b-u)}} - T_{P2P} \qquad (11)$$

Consideration of a Peer Arrival Rate

In the above description, the peer arrival rate has been assumed to be a constant. A method of setting a proper interval length between two consecutive sessions when the arrival rate of the peer 200 is rapidly changed using the arrival rate of the peer 200 is described below.

Figure 9:
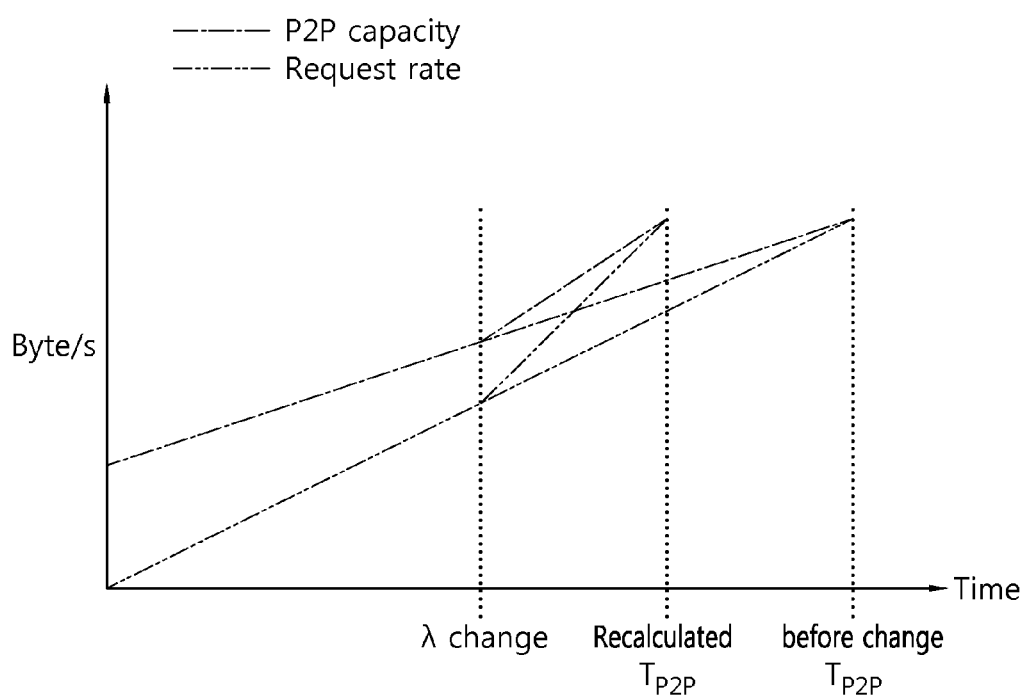
FIG. 9 is a graph illustrating a situation in which an arrival rate is increased and other realistic parameters are not taken into consideration in data transmission in accordance with an embodiment of the present invention.

A case where the interval between sessions is changed is that the time $T_{P2P}$ is shortened or lengthened at a time when the peer arrival rate $\lambda$ is varied. FIG. 9 illustrates the simplest situation in which an arrival rate is increased and other realistic parameters are not taken into consideration. In the system in accordance with an embodiment of the present invention, the server 100 may recalculate the time $T_{P2P}$ when detecting an increase of the arrival rate of the peer 200. In the above example, the length of the time $T_{P2P}$ recalculated needs to be shorter than that of the original time in order to reduce a multicasting interval. It is assumed that $Tr_{P2P}$ denotes a time including $T_{P2P}$ remaining from a current time and $Tr_{P2P,new}$ denotes a recalculated remaining time. If a new arrival rate $\lambda$ is the product of "a" and a previous arrival rate, the recalculated remaining time $Tr_{P2P,new}$ is 1/a of the time $Tr_{P2P}$. When a P2P capacity is estimated, similar evaluation is required to take the size of a chunk into consideration. The server 100 may set a next multicast session start time based on the value of the recalculated remaining time $Tr_{P2P,new}$. In such a case, additional unicast attributable to an increase of the peers 200 can be prevented.

Figure 10:
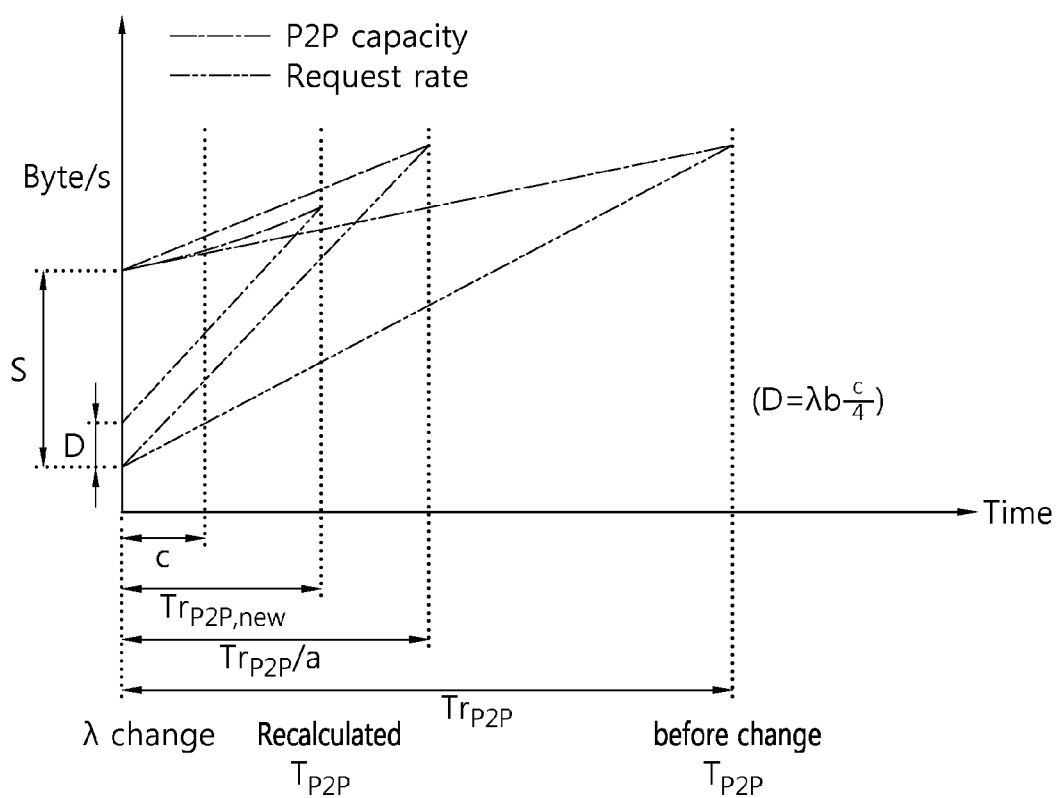
FIG. 10 is a graph illustrating an example in which $T_{P2P}$ is varied when $\lambda$ increases in data transmission in accordance with an embodiment of the present invention.

FIG. 10 is a graph illustrating an example in which the time $T_{P2P}$ is varied when the new arrival rate $\lambda$ increases in data transmission in accordance with an embodiment of the present invention. The recalculated remaining time $Tr_{P2P}$, new is calculated to be 1/a times the time $Tr_{P2P}$ by not taking the size of a chunk into consideration. The size of a chunk has two modifications. The request rate is increased by "αD" as in Equation 4. Furthermore, the slope of a P2P capacity is not increased until a second "c". S is a difference between the capacities of a P2P capacity and a request rate at a time when the new arrival rate $\lambda$ illustrated in FIG. 10 is varied. In such a case, S is $\lambda Tr_{P2P}(b/2-u)$. Accordingly, the recalculated remaining time $Tr_{P2P,new}$ may be represented as in Equation 12 below. Meanwhile, if the time $Tr_{P2P}$ is smaller than "c", the time $Tr_{P2P}$ is used because the length of time is very short.

$$Tr_{P2P,new} = \frac{(S + \lambda uc - a\lambda bc - D)Tr_{P2P}}{aS} + c \qquad (12)$$

Figure 11:
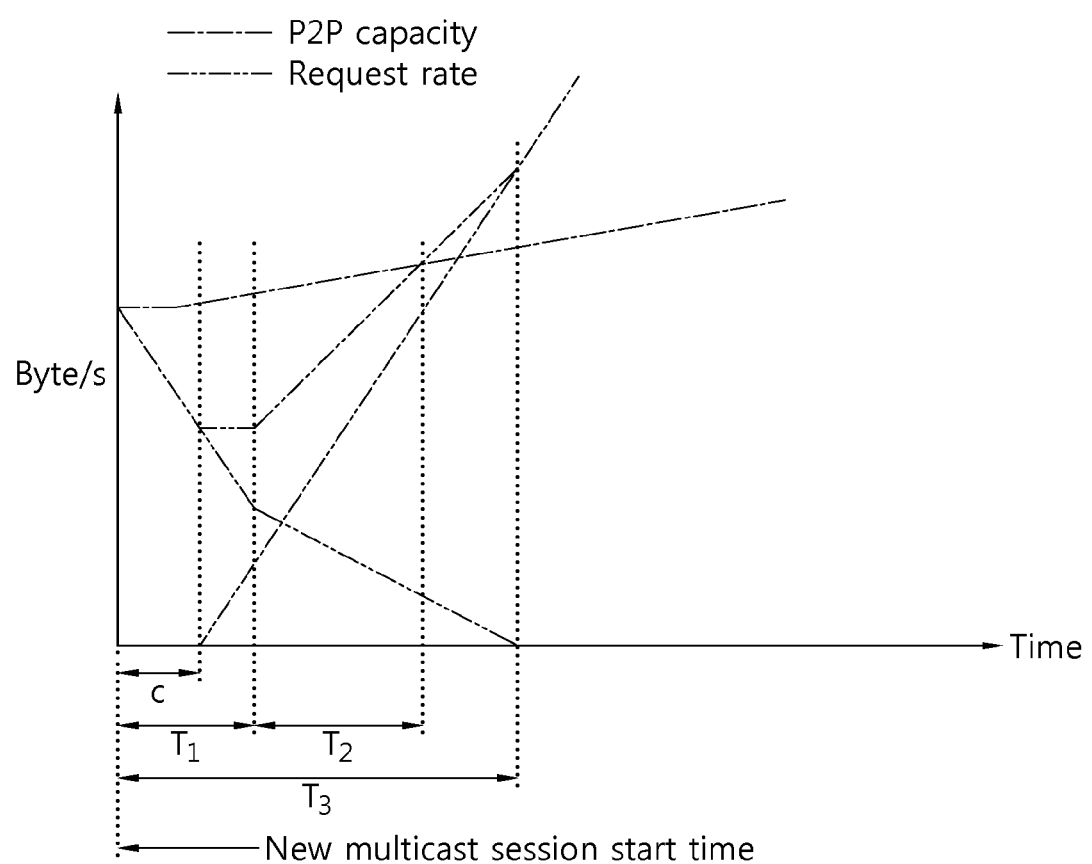
FIG. 11 is a graph illustrating a case where the arrival rate of peers between multicast sessions is different in data transmission in accordance with an embodiment of the present invention.

In another case where the interval between sessions is changed, this is the time when $T_{P2P}$ at a new multicast session start time is determined. When the arrival rate of the peer 200 is changed, the remaining length of a previous cycle needs to be taken into consideration. FIG. 11 is a graph illustrating a case where the arrival rate of a peer between multicast sessions is different. A second example in which the start time of a multicast session is controlled is described below with reference to FIG. 11. If the time when the arrival rate $\lambda$ is varied is placed close to the boundary between two sessions, it is necessary to reduce the length of a new multicast session. FIG. 11 illustrates such a situation when the arrival rate $\lambda$ is increased. If the arrival rate $\lambda$ is constant, a total request rate remains constant during the period in which a request in a previous session remains. If the arrival rate $\lambda$ is not constant, a total request rate is increased because the request rate of a previous session becomes slowly smaller than a new arrival rate $\lambda$. In some embodiments, as illustrated in FIG. 11, a P2P capacity graph and a request rate graph meet earlier than that expected. It is assumed that $T_1$, $T_2$, and $T_3$ are time lengths in the present embodiment. An equation for obtaining $T_2$ may be represented as in Equation 13 below.

$$T_2 = \frac{2au(T_1 - \beta - c) - \frac{bc}{2} + 2abc}{(a-1)b - 2au} \qquad (13)$$

If $T_2$ is smaller than $T_3$, a new multicast session is matched with $T_2$. If $T_2$ is greater than $T_3$, the length of a new multicast session is determined using the method described above.

The length of a next interval also needs to be calculated. In Equation 6, a current P2P network capacity is represented by $\lambda u T_E$. Such a term is obtained under the assumption that the arrival rate of the peer 200 is constant during $T_E$. When the arrival rate $\lambda$ is varied, however, to estimate a P2P capacity as described above may not be precise. Equation 14 below is used to estimate a P2P capacity.

$$P(T_E) + \lambda u(T_{P2P} - \beta - c) = \lambda b \frac{T_{P2P} - \beta + \alpha \frac{c}{2}}{2} \quad (14)$$

$P(T_E)$ is a P2P network capacity at the time $T_E$. In the real world, in order to obtain the value $P(T_E)$, it is necessary to track the current number of seeds. In order to track the current number of seeds, the server 100 may use a seed tracker. $T_{P2P}$ is derived from Equation 14. Furthermore, $T_{P2P}$ is used as described above.

Control of Departure of the Peer 200

The peer 200 that has completed the reception of content departs from the system. Such a departure rate needs to be applied to Equation 6. $\mu$ denotes the departure rate of the peers 200. The left side of Equation 6 is indicative of a P2P capacity that is increased according to the arrival rate $\lambda$. If the peers 200 that has completed the reception of content departs from the system at a ratio of $\mu$, a ratio in which a P2P capacity is increased needs to be changed into "$\lambda-\mu$". The right side of Equation 6 is indicative of the number of requests, which does not need to be modified. New $T_{P2P}$ may be obtained by calculating Equation 15 with respect to $T_{P2P}$.

$$(\lambda - \mu) u(T_E + T_{P2P} - \beta - c) = \lambda b \frac{T_{P2P} - \beta + \alpha \frac{c}{2}}{2} \quad (15)$$

Figure 12:
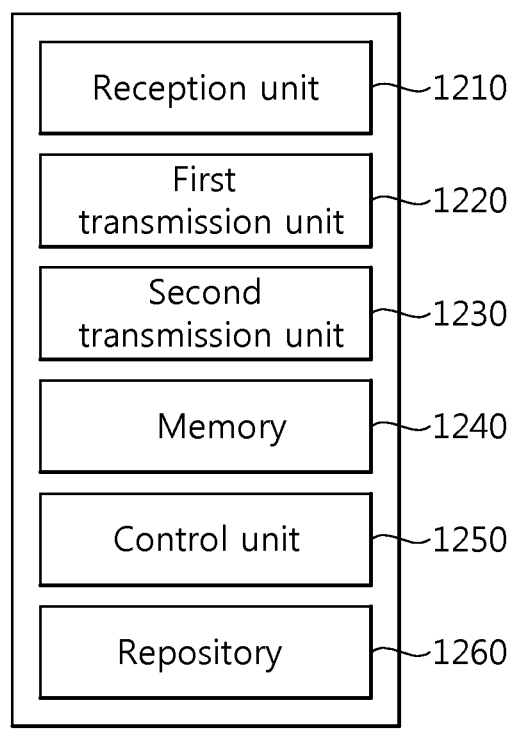
FIG. 12 is a block diagram illustrating the configuration of a data transmission apparatus in accordance with an embodiment of the present invention.

FIG. 12 is a block diagram illustrating the configuration of a data transmission apparatus in accordance with an embodiment of the present invention. For example, the data transmission apparatus in accordance with an embodiment of the present invention may be a server, and includes a reception unit 1210, a first transmission unit 1220, a second transmission unit 1230, memory 1240, a repository 1260, and a control unit 1250. At least any one of the elements may be omitted depending on use, the memory 1240 and the repository 1260 may be implemented as a single piece of memory, and the first transmission unit 1220 and the second transmission unit 1230 may be implemented as a single transmission unit.

The reception unit 1210 receives a message from a user terminal. For example, the message received from the user terminal may be a request message for the transmission of content, a request message for lost data not included in multicast data, or a status message for the user terminal. The reception unit 1210 transfers the received message to the control unit 1250. Furthermore, the reception unit 1210 may be provided with external content from an external content provider. The provided external content may be stored in the memory 1240 or the repository 1260.

The first transmission unit 1220 sends multicast data to a user terminal through multicast under the control of the control unit 1250. The first transmission unit 1220 may periodically perform multicast transmission under the control of the control unit 1250.

The second transmission unit 1230 sends assistant data that supplements the multicast data to the user terminal under the control of the control unit 1250. The assistant data is information about another device that has lost data not delivered to the user terminal or multicast data not delivered to the user terminal. The second transmission unit 1230 may directly send the lost data to the user terminal through unicast. Another device that has the multicast data not delivered to the user terminal may be another terminal or another server. The second transmission unit 1230 may send the information about another device having lost data to a user terminal that has requested the lost data so that the user terminal that has requested the lost data may receive the lost data from the device having the lost data. The transmission of data between the user terminal that has requested the lost data and the device having the lost data may be performed using P2P.

The memory 1240 stores data for the operations of the reception unit 1210, the first transmission unit 1220, the second transmission unit 1230, and the control unit 1250. For example, such data may include a message transmitted from a user terminal to the reception unit 1210, content data to be transmitted by the first transmission unit 1220 and the second transmission unit 1230, or an instruction set for the operation of the control unit 1250. From among them, the content data having a high capacity may be stored in the repository 1260.

The control unit 1250 performs the aforementioned data transmission methods by controlling the reception unit 1210, the first transmission unit 1220, the second transmission unit 1230, and the memory 1240.

Figure 13:
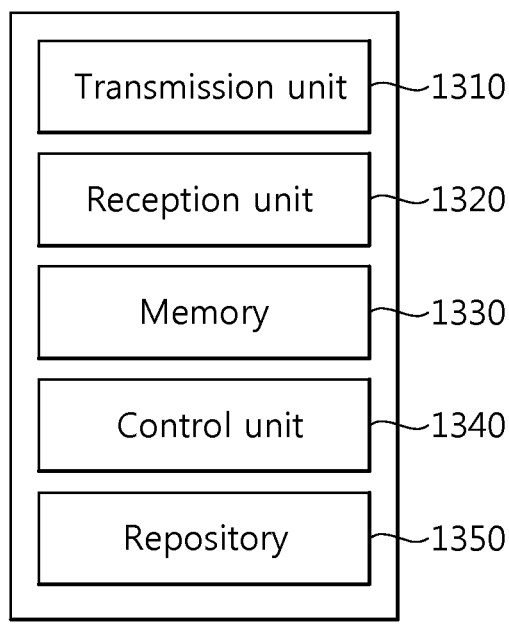
FIG. 13 is a block diagram illustrating the configuration of a data reception apparatus in accordance with an embodiment of the present invention.

FIG. 13 is a block diagram illustrating the configuration of a data reception apparatus in accordance with an embodiment of the present invention. For example, the data reception apparatus in accordance with an embodiment of the present invention may be a user terminal, and includes a transmission unit 1310, a reception unit 1320, memory 1330, a repository 1350, and a control unit 1340. At least any one of the elements may be omitted depending on use, and the memory 1330 and the repository 1350 may be implemented using a single piece of memory.

The transmission unit 1310 sends a message to the data transmission apparatus under the control of the control unit 1340. For example, the transmitted message may be a content request message, a message to request lost data not included in received multicast data, or a status message for a user terminal.

The reception unit 1320 receives data and messages from the data transmission apparatus. The received data may include, for example, multicast data transmitted by the data transmission apparatus through multicast transmission and lost data transmitted by another device through P2P transmission. The message may include, for example, information about another device having lost data and information about the status of a device for P2P connection that has been received from such an apparatus.

The memory 1330 store data for the operations of the transmission unit 1310, the reception unit 1320, and the control unit 1340. For example, such data may be data that is necessary for the transmission unit 1310 to send data to the outside, data or a message externally received by the reception unit 1320, or an instruction set for the operation of the control unit 1250. From among them, the content data having a high capacity may be stored in the repository 1350.

The control unit 1340 performs the aforementioned data reception methods by controlling the transmission unit 1310, the reception unit 1320, the memory 1330, and the repository 1350.

The data transmission method and apparatus according to the aforementioned embodiments of the present invention are advantageous in that they can reduce a load of a central server using the network resources of users by configuring a P2P network using user terminals in providing streaming service and they have no significant difference in quality of service experienced by users compared to unicast transmission by reducing the deterioration (e.g., a start delay time and interrupted playback) of service quality when providing VOD streaming service using the existing P2P.

Furthermore, there is an advantage in that small-scale business operators who require a small budget or operators who newly start service can start business because high-capacity VOD streaming service is provided at a low cost.

Furthermore, there is an advantage in that Quality of Experience (QoE) experienced by all users connected to a network can be improved by reducing a load of a server using IP multicast and reducing network use necessary to provide service.

The illustrated characteristics may be executed in a digital electronic circuit, computer hardware, firmware or combinations of them. The characteristics may be executed in a computer program product implemented in a storage device within a machine-readable storage device, for example, for execution according to a programmable processor. Furthermore, the characteristics may be executed by a programmable processor configured to execute the program of instructions for executing the functions of the aforementioned embodiments by operating on input data and generating output. The aforementioned characteristics may be executed within one or more computer programs that may be executed on a programmable system, including at least one programmable processor, at least one input device, and at least one output device combined in order to receive data and instructions from a data storage system and to send data and instructions to a data storage system. The computer program includes a set of instructions that may be directly or indirectly used in a computer in order to execute a specific operation on specific results. The computer program may be written in any one form of programming languages including complied or interpreted languages, and may be used in any form that is included as a module, a device, a subroutine, another unit suitable for being used in another computer environment, or a program that may be independently manipulated.

Proper processors for executing the program of the instructions may include, for example, both general-purpose and special-purpose micro processors, and a single processor or one of multi-processors of different types of computers. Furthermore, the computer program instructions for implementing the aforementioned characteristics and suitable storage devices for implementing data may include, for example, semiconductor memory devices, such as EPROM, EEPROM, and flash memory devices; magnetic devices, such as internal hard disks and removable disks; magneto-optical disks; and all types of non-volatile memory including CD-ROM and DVD-ROM. The processor and the memory may be integrated within Application-Specific Integrated Circuits (ASICs) or may be added by ASICs.

The present invention has been described based on a series of the function blocks, but the present invention is not limited to the aforementioned embodiments and the accompanying drawings. It is evident to those skilled in the art to which the present invention pertains that the present invention may be substituted, modified, and changed in various ways without departing from the technical spirit of the present invention.

Combinations of the aforementioned embodiments are not limited to the aforementioned embodiment, and various forms of combinations may be provided depending on implementation and/or needs in addition to the aforementioned embodiments.

In the aforementioned embodiments, although the methods have been described based on the flowcharts in the form of a series of steps or blocks, the present invention is not limited to the sequence of the steps, and some of the steps may be performed in a different order from that of other steps or may be performed simultaneous to other steps. Furthermore, those skilled in the art will understand that the steps shown in the flowchart are not exclusive and the steps may include additional steps or that one or more steps in the flowchart may be deleted without affecting the scope of the present invention.

The aforementioned embodiments include various aspects of examples. Although all kinds of possible combinations for representing the various aspects may not be described, those skilled in the art will understand that other possible combinations are possible. Accordingly, the present invention should be construed as including all other replacements, modifications, and changes which fall within the scope of the claims.

What is claimed is:

1. A data transmission method of sending content data from a server to a terminal, comprising:
   sending, by the server, multicast data to a terminal joined in a multicast stream through multicast transmission;
   determining, by the server, whether a peer-to-peer (P2P) capacity of at least one device that received multicast data not delivered to the joined terminal is sufficient to send the received multicast data not delivered to the joined terminal;
   sending, by the server, information about the device that received the multicast data not delivered to the joined terminal, in response to the P2P capacity being sufficient;
   performing, by the server, a comparison on an uplink capacity of one or any combination of devices having the multicast data not delivered to the joined terminal and a number of joined terminals that request a transmission of assistant data;
   determining whether the P2P capacity is saturated based on a result of the comparison; and
   sending, by the server, the assistant data that comprises the multicast data not delivered to the joined terminal, in response to the determination that the P2P capacity is saturated,
   wherein the assistant data is sent during at least a portion of the time while sending, by the server, the multicast data to the joined terminal,
   wherein the multicast transmission is periodically generated in a cycle determined based on a request rate of at least one terminal and a P2P capacity of devices having the assistant data,
   wherein the cycle is changed based on an arrival rate of the at least one terminal, and
   wherein a time length of P2P request processing and a time length of request processing of the server are calculated based on the arrival rate of the at least one terminal.

2. The data transmission method of claim 1, wherein the multicast data not delivered to the joined terminal is data transmitted through the multicast stream before the joined terminal joins in a multicast session.

3. The data transmission method of claim 1, wherein the assistant data is sent through a unicast stream while the multicast transmission is performed.

4. The data transmission method of claim 1, wherein the sending of the multicast data to the terminal joined in the multicast stream through the multicast transmission comprises:
    collecting requests of terminals that have a delay time and are joined with respect to the multicast data prior to a start of the multicast transmission; and
    sending the multicast data to a joined terminal that has requested the multicast data during the delay time through multicast transmission.

5. The data transmission method of claim 1, wherein the multicast stream begins at a point of time based on a time at which a load on the server becomes a minimum.

6. The data transmission method of claim 1, wherein
    a total request rate remains constant during a period in which a request in a previous session remains, in response to the arrival rate being constant, and
    a total request rate is increased by virtue of the request rate of a previous session becoming smaller than a new arrival rate, in response to the arrival rate not being constant.

7. The data transmission method of claim 1, wherein the cycle is calculated based on the time length of the P2P request processing and the time length of request processing of the server.

8. The data transmission method of claim 7,
    further comprising determining a time including the time length of the P2P request processing remaining from a current time, and a recalculated time including the time length of the P2P request processing remaining from the current time, and
    wherein the recalculated time is determined based on a load on the server, the arrival rate, a content playback rate, a chuck length, and the time.

9. A non-transitory computer-readable storage medium storing instructions that, when executed by a processor, cause the processor to perform the method of claim 1.

10. A data reception method of receiving by a terminal content data from a server, comprising:
    receiving, by the terminal, multicast data of the server;
    requesting, by the terminal, lost data not included in the multicast data to the server; and
    receiving, by the terminal during at least a portion of a time the terminal is receiving the multicast data, the lost data from a device having the lost data, in response to a peer-to-peer (P2P) capacity of the device to send at least a portion of the lost data being sufficient;
    receiving, by the terminal, the lost data through a unicast stream, in response to a determination that the P2P capacity is saturated,
    wherein the determination that the P2P capacity is saturated is based on a comparison on an uplink capacity of one or any combination of devices having the multicast data not delivered to the joined terminal and a number of joined terminals that request a transmission of assistant data,
    wherein transmission of the multicast data is periodically generated in a cycle determined based on a request rate of at least one terminal and a P2P capacity of devices having the assistant data,
    wherein the cycle is changed based on an arrival rate of the at least one terminal, and
    wherein a time length of P2P request processing and a time length of request processing of the server are calculated based on the arrival rate of the at least one terminal.

11. The data reception method of claim 10, further comprising sending, by the terminal, reception conditions of the multicast data or available uplink bandwidth to the server.

12. A non-transitory computer-readable storage medium storing instructions that, when executed by a processor, cause the processor to perform the method of claim 10.

13. A server, comprising:
    a first transmission unit configured to send multicast data to a terminal through multicast transmission; and
    a second transmission unit configured to:
        send information about at least one device having multicast data not delivered to the terminal, in response to a peer-to-peer (P2P) capacity of the device being sufficient to send at least a portion of the multicast data not delivered to the terminal, wherein the information supplements the multicast data to the terminal during at least a portion of the time when the first transmission unit is sending multicast data;
        perform a comparison on an uplink capacity of one or any combination of devices having the multicast data not delivered to the joined terminal and a number of joined terminals that request a transmission of assistant data;
        determine whether the P2P capacity is saturated based on a result of the comparison;
        send the assistant data that comprises the multicast data not delivered to the terminal, in response to the P2P capacity being saturated,
        wherein the multicast transmission is periodically generated in a cycle determined based on a request rate of at least one terminal and a P2P capacity of devices having the assistant data,
        wherein the cycle is changed based on an arrival rate of the at least one terminal, and
        wherein a time length of P2P request processing and a time length request processing of the server are calculated based on the arrival rate of the at least one terminal.

14. The server of claim 13, wherein the multicast data not delivered to the terminal is data transmitted through a multicast stream before the terminal joins in a multicast session.

15. The server of claim 13, wherein the second transmission unit is further configured to send the multicast data not delivered to the terminal through unicast, in response to the P2P capacity being saturated.

16. The data transmission method of claim 13, wherein the first transmission unit is further configured to periodically perform the multicast transmission in a cycle determined by adding a load on the server for a time period in which a peer request is processed through unicast and a load on the server upon multicast.

17. A user terminal, comprising:
    a reception unit configured to:
        receive multicast data of a server;
        receive the lost data not included in the multicast data from a device, in response to a peer-to-peer (P2P) capacity of the device being sufficient to send at least a portion of the lost data;

receive the lost data through a unicast stream, in response to a determination by the server that the P2P capacity is saturated; and a transmission unit configured to request the lost data from the server, wherein the determination that the P2P capacity is saturated is based on a comparison on an uplink capacity of one or any combination of devices having the multicast data not delivered to the joined terminal and a number of joined terminals that request a transmission of assistant data, wherein transmission of the multicast data is periodically generated in a cycle determined based on a request rate of at least one terminal and a P2P capacity of devices having the assistant data, wherein the cycle is changed based on an arrival rate of the at least one terminal, and wherein a time length of P2P request processing and a time length request processing of the server are calculated based on the arrival rate of the at least one terminal.

18. The user terminal of claim 17, wherein the reception unit is further configured to receive the lost data through unicast transmission of the server or P2P transmission of the device having the lost data.

19. The user terminal of claim 17, wherein the lost data is multicast data of the server transmitted before the transmitting unit requests the lost data from the server.

* * * * *